(12) United States Patent  
Yuan et al.

(10) Patent No.: US 12,552,389 B2  
(45) Date of Patent: Feb. 17, 2026

(54) ROAD SAFETY ASSESSMENT METHOD AND APPARATUS, ELECTRONIC DEVICE AND READABLE MEDIUM

(71) Applicant: CRSC COMMUNICATION & INFORMATION GROUP COMPANY LTD., Beijing (CN)

(72) Inventors: Zhenjiang Yuan, Beijing (CN); Ai Zhang, Beijing (CN); Tianjiao Yang, Beijing (CN); Yiming Zhang, Beijing (CN); Yanzhen Bi, Beijing (CN)

(73) Assignee: CRSC COMMUNICATION & INFORMATION GROUP COMPANY LTD., Beijing (CN)

( * ) Notice: Subject to any disclaimer, the term of this patent is extended or adjusted under 35 U.S.C. 154(b) by 406 days.

(21) Appl. No.: 18/024,408

(22) PCT Filed: Sep. 23, 2021

(86) PCT No.: PCT/CN2021/119837  
§ 371 (c)(1),  
(2) Date: Mar. 2, 2023

(87) PCT Pub. No.: WO2022/111010  
PCT Pub. Date: Jun. 2, 2022

(65) Prior Publication Data  
US 2024/0025414 A1    Jan. 25, 2024

(30) Foreign Application Priority Data  
Nov. 27, 2020  (CN) .......................... 202011358556.X

(51) Int. Cl.  
*B60W 40/06*    (2012.01)  
*B60W 50/14*    (2020.01)

(52) U.S. Cl.  
CPC ............ *B60W 40/06* (2013.01); *B60W 50/14* (2013.01); *B60W 2050/143* (2013.01)

(58) Field of Classification Search  
CPC ................. B60W 40/06; B60W 50/14; B60W 2050/143; G08B 21/10; Y02A 10/40;  
(Continued)

(56) References Cited

U.S. PATENT DOCUMENTS 10,761,076 B2 *  9/2020  Mase ...................... G01W 1/14  
11,639,185 B2 *  5/2023  Beaurepaire ............. G08G 1/22  
                                                           701/26  
(Continued)

FOREIGN PATENT DOCUMENTS

CN    103149904 A    6/2013  
CN    104457905 A    3/2015  
(Continued)

OTHER PUBLICATIONS

Huiming Tang, Xinli Hu, Cong Xu, Changdong Li, Rui Yong, Liangqing Wang, A novel approach for determining landslide pushing force based on landslide-pile interactions, Engineering Geology, vol. 182, Part A, (Year: 2014).*

(Continued)

*Primary Examiner* — Huy Q Phan  
*Assistant Examiner* — Martin Walter Braunlich  
(74) *Attorney, Agent, or Firm* — Li & Cai Intellectual Property (USA) Office

(57) ABSTRACT

Provided are a road safety assessment method and apparatus, and an electronic device and a readable medium. The method comprises: acquiring real-time water level data in a culvert and real-time roadbed state data of a road within a preset distance range from the culvert (S201); on the basis of the roadbed state data, determining anti-pressure capability data of the road (S202); and on the basis of the water (Continued)

level data and the anti-pressure capability data, assessing the safety of the road to obtain a road safety assessment result (S203). The accuracy of road safety assessment is improved, and unattended monitoring without interruption can be realized.

14 Claims, 4 Drawing Sheets

(58) Field of Classification Search
CPC ....... Y02A 10/30; Y02A 50/00; E01C 11/227; G01N 33/42; G01N 2021/8854; G06Q 10/0635; G06Q 50/26
See application file for complete search history.

(56) References Cited

U.S. PATENT DOCUMENTS

2020/0141785 A1* 5/2020 Diekfuss ................ G01N 15/08
2020/0333315 A1* 10/2020 Mase ....................... E02D 17/20

FOREIGN PATENT DOCUMENTS

| | | | |
|---|---|---|---|
| CN | 106887118 | A | 6/2017 |
| CN | 108680733 | A | 10/2018 |
| CN | 110080071 | A | 8/2019 |
| CN | 111505010 | A | 8/2020 |
| CN | 112508370 | A | 3/2021 |
| KR | 20160038596 | A | 4/2016 |
| WO | WO 2018058203 | A2 | 4/2018 |

OTHER PUBLICATIONS

Borowiec, Anna, and Krzysztof Maciejewski. "Assessment of Susceptibility to Liquefaction of Saturated Road Embankment Subjected to Dynamic Loads" Studia Geotechnica et Mechanica, vol. 36, No. 1, Sciendo, 2014, pp. 15-22. https://doi.org/10.2478/sgem-2014-0002 (Year: 2014).*

Iverson, R. M et al. "Acute Sensitivity of Landslide Rates to Initial Soil Porosity." Science 290.5491 (2000): 513-516. (Year: 2000).*

Tingjing Wang, Youbing Lai. "Study on Flood Damage Mechanism and Protection Strategy of rural highway along stream line in Zhejiang Province," East China Highway, pp. 95-100, No. 2, Apr. 20, 2016.

China Patent Office, First Office Action issued Nov. 16, 2023 for application No. CN202011358556.X.

China Patent Office, Search Report issued Nov. 8, 2023 for application No. CN202011358556.X.

* cited by examiner

ROAD SAFETY ASSESSMENT METHOD AND APPARATUS, ELECTRONIC DEVICE AND READABLE MEDIUM

TECHNICAL FIELD

The present disclosure relates to the technical field of road safety, and specifically relates to a road safety assessment method and apparatus, an electronic device and a readable medium.

BACKGROUND

In the construction of roads, when a road passes through a depression or crosses a ditch, a culvert is desired to be built under the pavement to enable smooth flow of water under the road and thus avoid traffic obstruction. When a culvert is built, the culvert is typically designed based on local hydrology, cost, and other data. During a flood season, however, the water amount through the culvert is rapidly increased, and if corresponding measures are not taken in time, road facilities, such as roadbeds and pavements, may be damaged, and in severe cases, casualties may occur.

SUMMARY

The present disclosure provides a road safety assessment method and apparatus, an electronic device and a readable medium.

According to a first aspect of the present disclosure, there is provided a road safety assessment method, including:
  acquiring real-time water level data in a culvert and real-time roadbed state data of a road within a preset distance range from the culvert;
  on the basis of the roadbed state data, determining anti-pressure capability data of the road; and
  on the basis of the water level data and the anti-pressure capability data, assessing the safety of the road to obtain a road safety assessment result.

According to a second aspect of the present disclosure, there is provided a road safety assessment apparatus, including:
  a collection module configured to acquire real-time water level data in a culvert and real-time roadbed state data of a road within a preset distance range from the culvert;
  a data processing module configured to determine, based on the roadbed state data, anti-pressure capability data of the road; and assess safety of the road based on the water level data and the anti-pressure capability data, to obtain a road safety assessment result.

According to a third aspect of the present disclosure, there is provided an electronic device, including:
  at least one processor; and
  a memory in communicative connection with the at least one processor; wherein
  the memory stores instructions executable by the at least one processor thereon which, when executed by the at least one processor, cause the at least one processor to implement any road safety assessment method as described above.

According to a fourth aspect of the present disclosure, there is provided a non-transitory computer-readable storage medium having computer instructions stored thereon, wherein the computer instructions are configured to cause the computer to implement any road safety assessment method as described above.

According to the road safety assessment method and apparatus, the electronic device and the readable medium of the present disclosure, anti-pressure capability data of the road is determined based on roadbed state data of a road within a preset range of the culvert; and then a road safety assessment result is obtained based on real-time water level data in the culvert and the anti-pressure capability data, so that unattended monitoring without interruption can be implemented, the labor amount and cost can be reduced, and, compared with the road safety assessment depending on merely water level data, the accuracy of road safety assessment can be improved, and the damages to road facilities, such as roadbeds and bridge floors, can be reduced.

It should be understood that the description in this part is not intended to identify key or essential features of embodiments of the present disclosure, nor is it intended to limit the scope of the present disclosure. Other features of the present disclosure will become apparent from the following description.

BRIEF DESCRIPTION OF DRAWINGS

Accompanying drawings are provided for further understanding of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art by describing in detail exemplary embodiments thereof with reference to the attached drawings.

Figure 1:
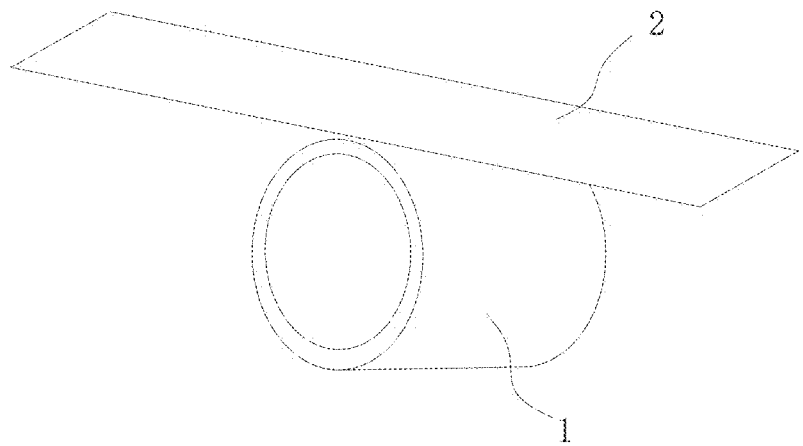
FIG. 1 is an application scenario diagram of a road safety assessment method according to an embodiment of the present disclosure.

In the drawings:
1—culvert; 2—pavement; 400—road safety assessment apparatus; 401—collection module; 41—water immersion sensor; 42—roadbed state data collection unit; 421—soil pressure gauge; 422—soil moisture content monitor; 402—data processing module; 403—alarm information generation module; 404—display module; 405—power supply module; 451—solar panel; 452—storage battery pack; 600—device; 601—computing unit; 602—read-only memory; 603—random access memory; 604—bus; 605—I/O interface; 606—input unit; 607—output unit; 608—storage unit; and 609—communication unit.

DETAIL DESCRIPTION OF EMBODIMENTS

In order to make those skilled in the art better understand the technical solutions of the present disclosure, exemplary embodiments of the disclosure will be described below in conjunction with the accompanying drawings, in which various details of the embodiments of the present disclosure are included to assist understanding, and should be considered as being merely exemplary. Therefore, those of ordinary skill in the art will recognize that various changes and modifications of the embodiments described herein can be made without departing from the scope and spirit of the present disclosure. Also, descriptions of well-known functions and constructions are omitted in the following description for clarity and conciseness.

The embodiments of the present disclosure and features thereof may be combined with each other as long as they are not contradictory.

As used herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof. The terms "connected" or "coupled" and the like are not restricted to physical or mechanical connections, but may include electrical connections, whether direct or indirect.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

FIG. 1 is an application scenario diagram of a road safety assessment method according to an embodiment of the present disclosure. As shown in FIG. 1, a culvert 1 is disposed below a pavement 2, and, as a drainage facility for a road, is a place where a potential safety hazard is likely to occur. Monitoring a water level in the culvert is a common monitoring means for eliminating potential road safety hazards. However, safety of the road cannot be accurately determined from the water level in the culvert.

Figure 2:
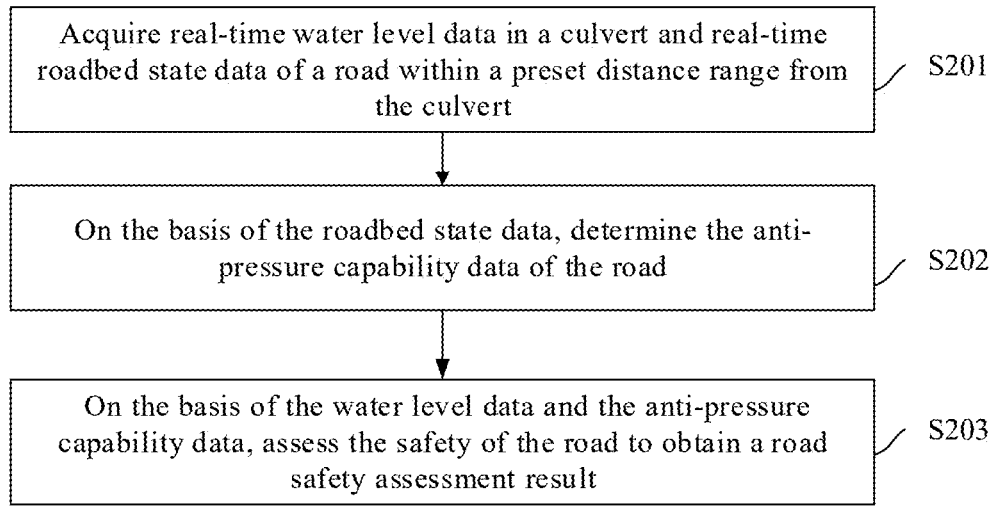
FIG. 2 is a flowchart of a road safety assessment method according to an embodiment of the present disclosure.

In a first aspect, the present disclosure provides a road safety assessment method. FIG. 2 is a flowchart of a road safety assessment method according to an embodiment of the present disclosure. As shown in FIG. 2, the road safety assessment method includes the following steps S201 to S203.

At step S201, acquiring real-time water level data in a culvert and real-time roadbed state data of a road within a preset distance range from the culvert.

The water level data includes a height of a free water surface in the culvert relative to a bottom surface of the culvert. The roadbed state data is characteristic data representing a roadbed state. The preset range refers to a distance from the culvert along an extending direction of the road. The specific value of the preset range may be determined according to a geographical location of the culvert. For example, the predetermined range may be 5 m to 10 m, or may be other values.

In some embodiments, real-time water level data in the culvert and real-time roadbed state data within 10 m from the culvert are acquired, and safety of the road is assessed based on the water level data and the roadbed state data.

In some embodiments, the water level data is data collected by a water immersion sensor disposed in the culvert. The water immersion sensor may be a commercially available sensor for measuring water levels.

At step S202, determining, based on the roadbed state data, the anti-pressure capability data of the road.

The anti-pressure capability data of the road is used for reflecting a bearing capacity of the road, so as to determine whether a vehicle can smoothly pass through the road, i.e., to determine passing safety of the vehicle.

In this embodiment, the anti-pressure capability data of the road is determined based on the roadbed state data, i.e., based on characteristic data representing the roadbed state.

In some embodiments, the roadbed state data includes soil pressure data and soil moisture content data. The soil pressure data refers to pressure data of soil bodies in the roadbed, and includes a soil pressure value and the like. The soil moisture content data includes an absolute moisture content in the soil.

In some embodiments, determining, based on the roadbed state data, the anti-pressure capability data of the road includes: determining, based on the soil pressure data and the soil moisture content data, the anti-pressure capability data of the road. The anti-pressure capability data of the road may be determined from the soil pressure data and the soil moisture content data using an existing method, which is not limited in the embodiment.

In some embodiments, the soil pressure data is data collected by a soil pressure gauge disposed in the roadbed, and the soil moisture content data is data collected by a soil moisture content monitor disposed in the roadbed. The types of the soil pressure gauge and the soil moisture content monitor are not limited in the embodiment. The soil pressure gauge and the soil moisture content monitor are disposed in the roadbed, for example, in a height area below the pavement and above a top of the culvert, with a horizontal distance from the culvert within a preset range, such as 5 m to 10 m.

It should be noted that although in this embodiment, the roadbed state data includes soil pressure data and soil moisture content data, and the anti-pressure capability data is determined based on the soil pressure data and the soil moisture content data, the present disclosure is not limited thereto. The roadbed state data may also be determined from other monitoring data including the soil pressure data and the soil moisture content data.

At step S203, assessing safety of the road based on the water level data and the anti-pressure capability data, to obtain a road safety assessment result.

Compared with the road safety assessment method depending on merely a water level in the culvert, assessing safety of the road from both the water level in the culvert and the anti-pressure capability of the roadbed can make safety assessing of the road more accurate, so that a more accurate road safety assessment result can be obtained.

Figure 3:
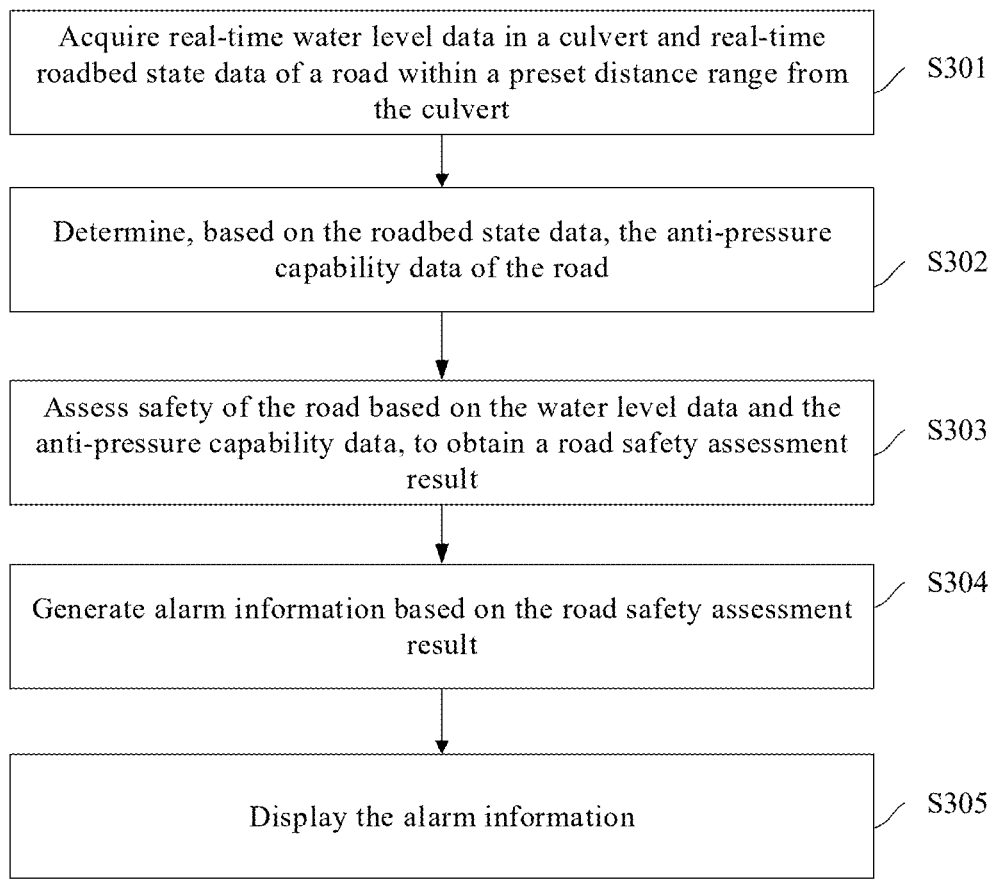
FIG. 3 is a flowchart of another road safety assessment method according to an embodiment of the present disclosure.

FIG. 3 is a flowchart of another road safety assessment method according to an embodiment of the present disclosure. As shown in FIG. 3, the road safety assessment method includes the following steps S301 to S305.

At step S301, acquiring real-time water level data in a culvert and real-time roadbed state data of a road within a preset distance range from the culvert.

At step S302, determining, based on the roadbed state data, the anti-pressure capability data of the road.

At step S303, assessing safety of the road based on the water level data and the anti-pressure capability data, to obtain a road safety assessment result.

Steps S301 to S303 are the same as steps S201 to S203, and are not repeated here.

At step S304, generating alarm information based on the road safety assessment result.

In some embodiments, when the road safety assessment result is in a safe range, no alarm information may be generated. When the road safety assessment result is beyond the safe range, alarm information may be generated. In some embodiments, alarm information may be generated regardless of the range of the road safety assessment result.

In order to enable road maintenance personnel and drivers to obtain more accurate road safety states, in some embodiments, the road safety assessment results are classified into multiple levels, the alarm information includes multiple levels, and different levels of road safety assessment results correspond to different levels of alarm information.

For example, the road safety assessment results are classified into five levels, D1, D2, D3, D4 and D5, where D1, the lowest level, represents a road with the highest safety, and D5, the highest level, represents a road with the lowest safety. Correspondingly, the alarm information includes five levels, L1, L2, L3, L4 and L5, where L1 corresponds to D1 and represents a road with the highest safety, and L5 corresponds to D5 and represents a road with the lowest safety.

In order to make the alarm information more intuitive to the road maintenance personnel and drivers, in some embodiments, the alarm information L1, L2, L3, L4 and L5 may be represented by white, blue, yellow, orange and red, respectively, or by color+text, such as white+normal, blue+attention, yellow+warning, orange+severe warning, red+no entry.

It should be noted that the level of the road safety assessment result may be set remotely as needed or according to seasons, which is simple, convenient, and highly practical.

In some embodiments, the alarm information includes at least one of warning information or traffic information of a vehicle. The warning information is information for warning monitoring personnel and drivers. The traffic information of the vehicle is road safety information provided for drivers, such as no entry, attention, and the like.

At step S305, displaying the alarm information.

The alarm information may be displayed at a road monitoring center for reminding the monitoring personnel to take corresponding measures in time, such as opening a gate to release water or controlling the traffic flow. The alarm information may also be displayed on a display board at a roadside near the culvert to remind drivers.

In some embodiments, after generating the alarm information based on the road safety assessment result, the method further includes: generating, under the condition that the water level in the culvert is reduced, alarm recovery information based on the road safety assessment result.

The roadbed state data will change along with the reduced water level in the culvert, while the anti-pressure capability and safety of the road are also changed. Therefore, when the water level in the culvert is reduced, alarm recovery information is generated based on the road safety assessment result.

In some embodiments, the alarm recovery information has a level corresponding to the road safety assessment result. For example, the alarm recovery information includes five levels, L1, L2, L3, L4 and L5, where L1 corresponds to D1 and represents a road with the highest safety, and L5 corresponds to D5 and represents a road with the lowest safety.

In some embodiments, it is judged whether the water level in the culvert is at a medium, high or ultrahigh level according to the water level data, then the road safety assessment result is determined according to the anti-pressure capability data, and the alarm information is determined based on the road safety assessment result. The anti-pressure capability data is determined from the soil pressure data and the soil moisture content data.

Table 1 shows a correspondence relationship of water level data, soil pressure data, and soil moisture content data to alarm information. The soil pressure data is compared with a soil pressure threshold, and the soil moisture content data is compared with a soil moisture content threshold.

TABLE 1

Relationship of water level data, soil pressure data, and soil moisture content data to alarm information.

| Sensor data information | | Soil pressure data | | Soil moisture content data | | Alarm information |
|---|---|---|---|---|---|---|
| | | <threshold | ≥threshold | <threshold | ≥threshold | |
| Water immersion sensors | Medium | 1 | 0 | 1 | 0 | Normal |
| | | 1 | 0 | 0 | 1 | |
| | | 0 | 1 | 1 | 0 | No entry |
| | | 0 | 1 | 0 | 1 | |
| | High | 1 | 0 | 1 | 0 | Attention |
| | | 1 | 0 | 0 | 1 | |
| | | 0 | 1 | 1 | 0 | No entry |
| | | 0 | 1 | 0 | 1 | |
| | Ultra-high | 1 | 0 | 1 | 0 | In situ processing |
| | | 1 | 0 | 0 | 1 | |
| | | 0 | 1 | 1 | 0 | In situ processing and no entry |
| | | 0 | 1 | 0 | 1 | |

In table 1, when the culvert has a medium water level, if the monitored soil pressure data is smaller than the soil pressure threshold, and the soil moisture content data is smaller than the soil moisture content threshold, the alarm information is normal. When the culvert has a medium water level, if the monitored soil pressure data is smaller than the soil pressure threshold, and the soil moisture content data is greater than or equal to the soil moisture content threshold, the alarm information is normal. When the culvert has a medium water level, if the monitored soil pressure data is greater than or equal to the soil pressure threshold, and the soil moisture content data is smaller than the soil moisture content threshold, the alarm information is no entry. When the culvert has a medium water level, if the monitored soil pressure data is greater than or equal to the soil pressure threshold, and the soil moisture content data is greater than or equal to the soil moisture content threshold, the alarm information is no entry.

When the culvert has a high water level, if the monitored soil pressure data is smaller than the soil pressure threshold, and the soil moisture content data is smaller than the soil moisture content threshold, the alarm information is attention. When the culvert has a high water level, if the monitored soil pressure data is smaller than the soil pressure threshold, and the soil moisture content data is greater than or equal to the soil moisture content threshold, the alarm information is attention. When the culvert has a high water level, if the monitored soil pressure data is greater than or equal to the soil pressure threshold, and the soil moisture content data is smaller than the soil moisture content threshold, the alarm information is no entry. When the culvert has a high water level, if the monitored soil pressure data is greater than or equal to the soil pressure threshold, and the soil moisture content data is greater than or equal to the soil moisture content threshold, the alarm information is no entry.

When the culvert has an ultrahigh water level, if the monitored soil pressure data is smaller than the soil pressure threshold, and the soil moisture content data is smaller than the soil moisture content threshold, the alarm information is in situ processing, i.e., the maintenance personnel processing on site. When the culvert has an ultrahigh water level, if the monitored soil pressure data is smaller than the soil pressure threshold, and the soil moisture content data is greater than or equal to the soil moisture content threshold, the alarm information is in situ processing, i.e., the maintenance personnel processing on site. When the culvert has an ultrahigh water level, if the monitored soil pressure data is greater than or equal to the soil pressure threshold, and the soil moisture content data is smaller than the soil moisture content threshold, the alarm information is in situ processing and no entry. When the culvert has an ultrahigh water level, if the monitored soil pressure data is greater than or equal to the soil pressure threshold, and the soil moisture content data is greater than or equal to the soil moisture content threshold, the alarm information is in situ processing and no entry.

According to the road safety assessment method provided in the embodiments of the present disclosure, anti-pressure capability data of the road is determined based on roadbed state data of a road within a preset range of the culvert; and then a road safety assessment result is obtained based on real-time water level data in the culvert and the anti-pressure capability data, so that unattended monitoring without interruption can be implemented, the labor amount and cost can be reduced, and, compared with the road safety assessment depending on merely water level data, the accuracy of road safety assessment can be improved and lost can be avoided.

Figure 4:
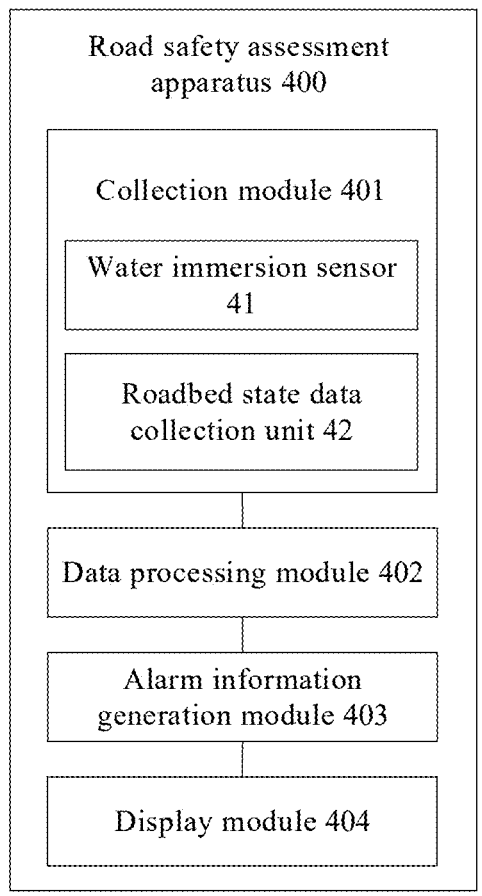
FIG. 4 is a schematic structural diagram of a road safety assessment apparatus according to an embodiment of the present disclosure.

In a second aspect, an embodiment of the present disclosure further provides a road safety assessment apparatus. FIG. 4 is a schematic structural diagram of a road safety assessment apparatus according to an embodiment of the present disclosure. As shown in FIG. 4, a road safety assessment apparatus 400 includes a collection module 401 and a data processing module 402.

The collection module 401 is configured to acquire real-time water level data in a culvert and real-time roadbed state data of a road within a preset distance range from the culvert.

The water level data includes a height of a free water surface in the culvert relative to a bottom surface of the culvert. The roadbed state data is characteristic data representing a roadbed state. The preset range refers to a distance from the culvert along an extending direction of the road. The specific value of the preset range may be determined according to a geographical location of the culvert. For example, the predetermined range may be 5 m to 10 m, or may be other values.

The data processing module 402 is configured to determine, based on the roadbed state data, anti-pressure capability data of the road; and assess safety of the road based on the water level data and the anti-pressure capability data, to obtain a road safety assessment result.

The anti-pressure capability data of the road is used for reflecting a bearing capacity of the road, so as to determine whether a vehicle can smoothly pass through the road. In this embodiment, the anti-pressure capability data of the road is determined based on the roadbed state data, i.e., based on characteristic data representing the roadbed state.

In some embodiments, the collection module 401 includes water immersion sensors 41 and a roadbed state data collection unit 42. The water immersion sensors 41 are configured to collect the water level data. The water immersion sensors 41 are disposed on an inner sidewall of the culvert, and arranged at intervals above a preset height on the inner sidewall of the culvert.

Figure 5:
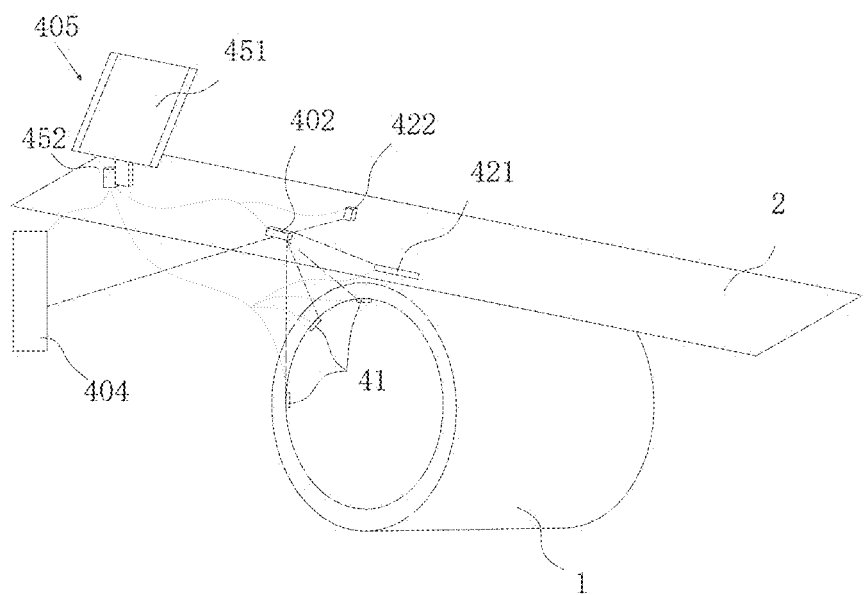
FIG. 5 is an application state diagram of a road safety assessment apparatus according to an embodiment of the present disclosure (in the diagram, dotted lines represent power supply lines, and dashed lines represent signal transmission lines)

FIG. 5 is an application state diagram of a road safety assessment apparatus according to an embodiment of the present disclosure (in the diagram, dotted lines represent power supply lines, and dashed lines represent signal transmission lines). Referring to FIGS. 4 and 5, a plurality of water immersion sensors 41 are provided on the inner sidewall of the culvert 1 at intervals along a height of the culvert 1.

In order to reduce the cost of the road safety assessment apparatus and as well as the number of water immersion sensors 41, the water immersion sensors 41 are provided on an upper middle portion of the inner sidewall of the culvert 1. For example, the water immersion sensors 41 are provided at intervals from half the height of the culvert 1 to the top of the culvert 1, and a distance between two adjacent water immersion sensors 41 may be set freely as needed.

In some embodiments, the water immersion sensors 41 may be highly sensitive water immersion sensors with insulation boards, so as to improve safety of the water immersion sensors.

The roadbed state data collection unit 42 is configured to collect the roadbed state data. The roadbed state data collection unit is disposed in a roadbed and within a preset distance range from the culvert.

In some embodiments, the preset distance range includes a horizontal distance range and a vertical distance range. In the embodiments of the present disclosure, the horizontal direction refers to any direction parallel to a plane of the pavement, and the horizontal distance range refers to a distance between the roadbed state data collection unit 42 and the culvert 1 in the direction parallel to the pavement. The vertical direction refers to a direction vertical to the plane of the pavement, and the vertical distance range refers to a distance between the roadbed state data collection unit 42 and the culvert 1 in the direction vertical to the pavement.

In some embodiments, the horizontal distance range between the roadbed state data collection unit 42 and the culvert 1 is 5 m to 10 m. In other words, the roadbed state data collection unit 42 is disposed within a horizontal distance range of 5 m to 10 m from the culvert 1. For example, one or more roadbed state data collection units 42 may be disposed within a horizontal distance range of 5 m from the culvert 1.

In some embodiments, the roadbed state data collection unit 42 is disposed within a height range between the pavement 2 and the top of the culvert 1.

In some embodiments, the roadbed state data collection unit 42 includes a soil pressure gauge 421 and a soil moisture content monitor 422. The soil pressure gauge 421 is configured to collect soil pressure data. The soil moisture content monitor 422 is configured to collect soil moisture content data.

For example, the soil pressure gauge 421 is disposed directly above the culvert 1 and below the pavement 2. The soil moisture content monitor 422 is disposed in the horizontal direction at a distance of 6 m from the culvert 1, and at a height within a range between the top of the culvert 1 and a lower side of the pavement 2.

In some embodiments, as shown in FIGS. 4 and 5, the road safety assessment apparatus further includes an alarm information generation module 403 and a display module 404 connected to the data processing module 402. The alarm information generation module 403 is configured to generate alarm information based on the assessment result; and the display module 404 is configured to display the alarm information.

In some embodiments, when the road safety assessment result is in a safe range, no alarm information may be generated. When the road safety assessment result is beyond the safe range, alarm information may be generated. In some embodiments, alarm information may be generated regardless of the range of the road safety assessment result.

In order to enable road maintenance personnel and drivers to obtain more accurate road safety states, in some embodiments, the alarm information generation module 403 classifies the road safety assessment results into multiple levels, the alarm information includes multiple levels, and different levels of road safety assessment results correspond to different levels of alarm information.

In some embodiments, the alarm information includes at least one of warning information or traffic information of a vehicle. The warning information is information for warning monitoring personnel and drivers. The traffic information of the vehicle is road safety information provided for drivers, such as no entry, attention, and the like.

The display module 404 may be a display screen, such as a liquid crystal display, or a projection device.

In some embodiments, the display module 404 is disposed at a road monitoring center, and configured to remind the monitoring personnel to take corresponding measures in time, such as opening a gate to release water or controlling the traffic flow. The display module 404 may also be disposed at a road side and at a certain distance from the culvert 1 to remind drivers.

In some embodiments, the alarm information generation module 403 is configured to, under the condition that the water level in the culvert is reduced, generate alarm recovery information based on the road safety assessment result, and display the alarm recovery information on the display module 404.

The roadbed state data will change along with the reduced water level in the culvert, while the anti-pressure capability and safety of the road are also changed. Therefore, when the water level in the culvert is reduced, alarm recovery information is generated based on the road safety assessment result.

In some embodiments, as shown in FIG. 5, the road safety assessment apparatus further includes: a power supply module 405 configured to supply electric energy for the road safety assessment apparatus, such as for the data processing module 402 and the water immersion sensors 41.

The power supply module 405 includes a solar panel 451 and a storage battery pack 452. The solar panel 451 is configured to convert solar energy into electric energy; and the storage battery pack 452 is configured to store the electric energy obtained by the solar panel 451 and supply electric energy for the road safety assessment apparatus. A charging module (not shown) is disposed between the solar panel 451 and the storage battery pack 452, and configured to charge the storage battery pack 452 with the electric energy obtained by the solar panel 451.

Using the electric energy obtained by the solar panel is green and clean, can reduce the energy consumption and maintenance cost, and implement unattended monitoring without interruption.

In some embodiments, the data processing module 402 may be an intelligent data processing module. An input end of the data processing module is connected to the water immersion sensors 41, the soil pressure gauge 421 and the soil moisture content monitor 422, and is configured to receive monitoring data from the water immersion sensors 41, the soil pressure gauge 421 and the soil moisture content monitor 422. An output end of the intelligent data processing module is connected to an input end of the alarm information generation module 403, which generates alarm information based on the road safety assessment result output from the intelligent data processing module. An output end of the alarm information generation module 403 is connected to an input end of the display module 404, which displays the alarm information generated by the alarm information generation module 403.

When the water level in the culvert 1 rises to the water immersion sensors 41, the water immersion sensors 41 are triggered and transmit the collected water level data to the data processing module 402. The soil pressure gauge 421 and the soil moisture content monitor 422 respectively collect soil pressure data and soil moisture content data in real time and transmit the data to the data processing module 402, where the data processing module 402 determines a road safety assessment result based on the soil pressure data, the soil moisture content data and the water level data. The alarm information generation module 403 generates alarm information, which is then displayed on the display module.

The functions or included modules of the apparatus provided in the embodiments of the present disclosure may be used to execute the method described in the above method embodiments, and for the specific implementations and technical effects, reference may be made to the description of the above method embodiments, and for brevity, details are not repeated here.

According to the road safety assessment apparatus provided in the embodiment, the collection module acquires real-time water level data in a culvert and real-time roadbed state data of a road within a preset distance range from the culvert, and then the data processing module determines anti-pressure capability data of the road based on roadbed state data of a road within a preset range of the culvert; and obtains a road safety assessment result based on real-time water level data in the culvert and the anti-pressure capability data, so that unattended monitoring without interruption can be implemented, the labor amount and cost can be reduced, and, compared with the road safety assessment depending on merely water level data, the accuracy of road safety assessment can be improved, and the damages to road facilities, such as roadbeds and bridge floors, can be reduced.

In addition, the road safety assessment method and apparatus of the present disclosure can be used for monitoring and maintaining a plurality of culverts by a small number of people at the same time, thereby saving the labor cost.

In a third aspect, according to an embodiment of the present disclosure, the present disclosure further provides an electronic device, a readable storage medium, and a computer program product.

Figure 6:
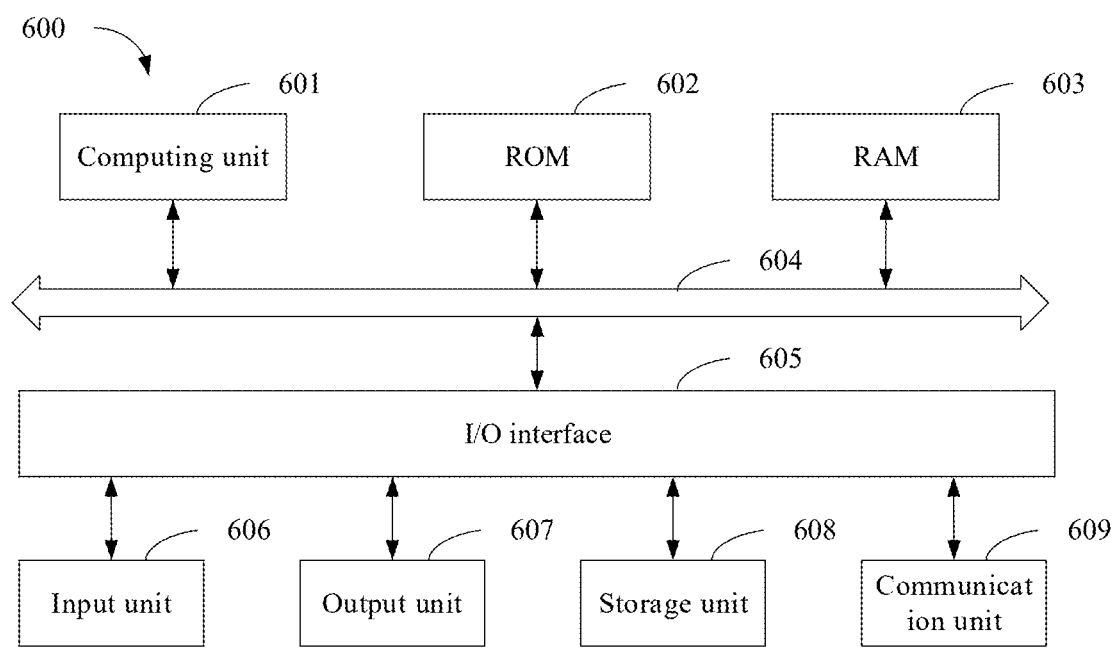
FIG. 6 is a block diagram of an electronic device for implementing a road safety assessment method according to an embodiment of the present disclosure.

FIG. 6 is a schematic block diagram of an example electronic device 600 that can be used to implement embodiments of the present disclosure. The electronic device is intended to represent various forms of digital computers, such as laptops, desktops, workstations, personal digital assistants, servers, blade servers, mainframes, and other suitable computers. The electronic device may also represent various forms of mobile devices, such as personal digital processors, cellular phones, smart phones, wearable devices, and other similar computing devices. The components shown herein, their connections and relationships, and their functions, are meant to be examples only, and are not intended to limit implementations of the present disclosure described and/or claimed herein.

As shown in FIG. 6, the device 600 includes a computing unit 601, which may perform various suitable actions and processes according to a computer program stored on a read-only memory (ROM) 602 or loaded from a storage unit 608 into a random access memory (RAM) 603. Various programs and data required for the operation of the device 600 may be further stored on the RAM 603. The computing unit 601, the ROM 602, and the RAM 603 are connected to each other via a bus 604. An input/output (I/O) interface 605 is also connected to the bus 604.

A number of components in the device 600 are connected to the I/O interface 605, including: an input unit 606, such as a keyboard, a mouse, and the like; an output unit 607, such as various types of displays, speakers, and the like; a storage unit 608, such as a magnetic disk, an optical disk, or the like; and a communication unit 609, such as a network card, a modem, a wireless communication transceiver, and the like. The communication unit 609 allows the device 600 to exchange information/data with other devices via a computer network such as the internet and/or various telecommunication networks.

The computing unit 601 may be various general and/or special purpose processing components with processing and computing capabilities. Some examples of the computing unit 601 include, but are not limited to, a central processing unit (CPU), a graphics processing unit (GPU), various dedicated artificial intelligence (AI) computing chips, various computing units running machine learning model algorithms, a digital signal processor (DSP), and any other suitable processors, controllers, microcontrollers, and the like. The computing unit 601 performs the methods and processes described above, such as the road safety assessment method. For example, in some embodiments, the road safety assessment method may be implemented as a computer software program tangibly embodied in a machine-readable medium, such as the storage unit 608. In some embodiments, part or all of a computer program may be loaded onto and/or installed onto the device 600 via the ROM 602 and/or the communications unit 609. When the computer program is loaded onto the RAM 603 and executed by the computing unit 601, one or more steps of the road safety assessment method described above can be performed. Alternatively, in other embodiments, the computing unit 601 may be configured to perform the road safety assessment method in any other suitable manner (e.g., by means of firmware).

Various implementations of the systems and techniques described herein above may be implemented in digital electronic circuitry, integrated circuitry, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. These various implementations may include: implemented in one or more computer programs which are executable and/or interpretable on a programmable system including at least one programmable processor. The programmable processor may be a special or general purpose programmable processor, and may receive data and instructions from, and transmit data and instructions to, a storage system, at least one input device, and at least one output device.

Program codes for implementing the method of the present disclosure may be written in any combination of one or more programming languages. These program codes may be provided to a processor or controller of a general purpose computer, a special purpose computer, or other programmable data processing apparatus, such that the program codes, when executed by the processor or controller, cause the functions/acts specified in the flowchart and/or block diagram to be performed. The program codes may be executed entirely on a machine, partly on a machine, as a stand-alone software package partly on a machine and partly on a remote machine or entirely on a remote machine or server.

In the context of the present disclosure, the machine-readable medium may be a tangible medium that can contain, or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, a portable computer diskette, a hard disk, a random access memory (RAM), a read-only memory (ROM), an erasable programmable read-only memory (EPROM or FLASH), an optical fiber, a portable compact disc read-only memory (CD-ROM), an optical storage device, a magnetic storage device, or any suitable combination of the foregoing.

To provide interaction with a user, the systems and techniques described herein can be implemented on a computer having: a display device (e.g., a cathode ray tube (CRT) or liquid crystal display (LCD) monitor) configured to display information to the user; and a keyboard and pointing device (e.g., a mouse or a trackball) through which the user may provide input to the computer. Other kinds of devices may also be used for interaction with a user. For example, feedback provided to the user may be any form of sensory feedback (e.g., visual feedback, audible feedback, or tactile feedback); and input from the user may be received in any form, including acoustic, speech, or tactile input.

The systems and techniques described herein may be implemented in a computing system that includes a back-end component (e.g., as a data server), or that includes a middleware component (e.g., an application server), or that includes a front-end component (e.g., a user computer having a graphical user interface or a web browser through which a user may interact with an implementation of the systems and techniques described herein), or that includes any combination of such back-end, middleware, or front-end components. The components of the system may be interconnected via any form or medium of digital data communication (e.g., a communication network). Examples of the communication network include: a local area network (LAN), a wide area network (WAN), and the internet.

The computer system may include a client and a server. The client and the server are generally remote from each other and typically interact via a communication network. The relationship of client and server is produced by computer programs running on a corresponding computer and having a client-server relationship to each other.

It should be understood that various forms of the flows shown above, reordering, adding or deleting steps, may be used. For example, the steps described in the present disclosure may be executed in parallel, sequentially, or in different orders, and are not limited herein as long as the desired results of the technical solutions disclosed in the present disclosure can be achieved.

The above specific implementations should not be construed as limiting the scope of the present disclosure. It should be understood by those skilled in the art that various modifications, combinations, sub-combinations and substitutions may be made, depending on the design requirements and other factors. Any modification, equivalent replacement, and improvement made within the spirit and principle of the present disclosure should be included in the protection scope of the present disclosure.

What is claimed is:

1. A road safety assessment method, characterized in comprising:
    acquiring real-time water level data in a culvert and real-time roadbed state data of a road within a preset distance range from the culvert by a collection module comprising water immersion sensors and a roadbed state data collection unit;
    on the basis of the roadbed state data, determining anti-pressure capability data of the road by a data processing module; and
    on the basis of the water level data and the anti-pressure capability data, assessing the safety of the road to obtain a road safety assessment result by the data processing module.

2. The road safety assessment method according to claim 1, characterized in that the roadbed state data comprises soil pressure data and soil moisture content data; wherein
    determining, based on the roadbed state data, the anti-pressure capability data of the road comprises:
    determining, based on the soil pressure data and the soil moisture content data, the anti-pressure capability data of the road.

3. The road safety assessment method according to claim 1, characterized in that after assessing safety of the road based on the water level data and the anti-pressure capability data, to obtain the road safety assessment result, the method further comprises:
    generating alarm information based on the road safety assessment result; and
    displaying the alarm information.

4. The road safety assessment method according to claim 3, characterized in that the road safety assessment result comprises multiple levels, the alarm information comprises multiple levels, and the levels of the alarm information correspond to the levels of the road safety assessment result.

5. The road safety assessment method according to claim 3, characterized in that the alarm information comprises at least one of warning information or traffic information for a vehicle.

6. The road safety assessment method according to claim 3, characterized in that after generating the alarm information based on the road safety assessment result, the method further comprises:
    generating, under the condition that the water level in the culvert is reduced, alarm recovery information based on the road safety assessment result.

7. A road safety assessment apparatus, characterized in comprising:
    a collection module comprising water immersion sensors and a roadbed state data collection unit, and configured to acquire real-time water level data in a culvert and real-time roadbed state data of a road within a preset distance range from the culvert; and
    a data processing module configured to determine, based on the roadbed state data, anti-pressure capability data of the road; and assess safety of the road based on the water level data and the anti-pressure capability data, to obtain a road safety assessment result.

8. The road safety assessment apparatus according to claim 7, characterized in that
    the water immersion sensors configured to collect the water level data, wherein the water immersion sensors are disposed on an inner sidewall of the culvert, and arranged at intervals above a preset height on the inner sidewall of the culvert; and
    the roadbed state data collection unit configured to collect the roadbed state data, wherein the roadbed state data collection unit is disposed in a roadbed and within a preset distance range from the culvert.

9. The road safety assessment apparatus according to claim 8, characterized in that the roadbed state data collection unit comprises:
    a soil pressure gauge configured to collect soil pressure data; and
    a soil moisture content monitor configured to collect soil moisture content data.

10. The road safety assessment apparatus according to claim 7, characterized in that the apparatus further comprises an alarm information generation module and a display module connected to the data processing module, wherein
    the alarm information generation module is configured to generate alarm information based on the assessment result; and
    the display module is configured to display the alarm information.

11. The road safety assessment apparatus according claim 7, characterized in that the apparatus further comprises:
    a power supply module configured to supply electric energy for the apparatus.

12. The road safety assessment apparatus according to claim 11, characterized in that the power supply module comprises:
    a solar panel configured to acquire electric energy; and
    a storage battery pack configured to store the electric energy and supply the electric energy for the apparatus.

13. An electronic device, comprising:
    at least one processor; and
    a memory in communicative connection with the at least one processor; wherein
    the memory stores instructions executable by the at least one processor thereon which, when executed by the at least one processor, cause the at least one processor to implement the road safety assessment method according to claim 1.

14. A non-transitory computer-readable storage medium having computer instructions stored thereon, wherein the computer instructions cause the computer to implement the road safety assessment method according to claim 1.

* * * * *